(12) United States Patent
Schwartz

(10) Patent No.: US 11,232,178 B2
(45) Date of Patent: Jan. 25, 2022

(54) SYSTEMS AND METHODS FOR BEHAVIORAL AUTHENTICATION USING A TOUCH SENSOR DEVICE

(71) Applicant: Synaptics Incorporated, San Jose, CA (US)

(72) Inventor: Adam L. Schwartz, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 361 days.

(21) Appl. No.: 15/853,058

(22) Filed: Dec. 22, 2017

(65) Prior Publication Data

US 2019/0197218 A1    Jun. 27, 2019

(51) Int. Cl.
| | |
|---|---|
| *G06F 21/31* | (2013.01) |
| *G06F 3/041* | (2006.01) |
| *G06F 21/32* | (2013.01) |
| *G06K 9/00* | (2006.01) |
| *G06F 3/044* | (2006.01) |

(52) U.S. Cl.
CPC ............ *G06F 21/316* (2013.01); *G06F 3/044* (2013.01); *G06F 3/0416* (2013.01); *G06F 21/32* (2013.01); *G06K 9/0002* (2013.01); *G06K 9/00885* (2013.01)

(58) Field of Classification Search
CPC ...... G06F 21/316; G06F 3/0416; G06F 3/044; G06F 21/32; G06K 9/0002; G06K 9/00885
See application file for complete search history.

(56) References Cited

U.S. PATENT DOCUMENTS

| | | |
|---|---|---|
| 8,938,787 B2 | 1/2015 | Turgeman |
| 9,069,942 B2 | 6/2015 | Turgeman |
| 9,071,969 B2 | 6/2015 | Turgeman |
| 9,275,337 B2 | 3/2016 | Turgeman et al. |

(Continued)

FOREIGN PATENT DOCUMENTS

| | | |
|---|---|---|
| WO | WO 12073233 A1 | 6/2012 |
| WO | WO 14203163 A1 | 12/2014 |

(Continued)

OTHER PUBLICATIONS

International Search Report in International Patent Application No. PCT/US2018/059388, dated Feb. 14, 2019.

(Continued)

*Primary Examiner* — Shin-Hon (Eric) Chen
*Assistant Examiner* — Jessica J South
(74) *Attorney, Agent, or Firm* — Leydig, Voit & Mayer, Ltd.

(57) ABSTRACT

Disclosed is an input device, comprising a touch sensor and a processing system. The touch sensor includes a touch sensing region and a plurality of pixels in the touch sensing region. The processing system is coupled to the touch sensor and comprises circuitry configured to: determine that a touch has occurred on a touch sensor; for each pixel included in the touch, receive touch information from the touch sensor; for each pixel included in the touch, determine a pixel response value for the pixel; and, compute a touch-based metric based on one or more pixel response values, wherein a model is used to perform behavioral authentication based on the touch-based metric.

23 Claims, 10 Drawing Sheets

(56) References Cited

U.S. PATENT DOCUMENTS

| | | |
|---|---|---|
| 9,418,221 B2 | 8/2016 | Turgeman |
| 9,450,971 B2 | 9/2016 | Turgeman et al. |
| 9,477,826 B2 | 10/2016 | Turgeman et al. |
| 9,483,292 B2 | 11/2016 | Turgeman et al. |
| 9,526,006 B2 | 12/2016 | Turgeman |
| 9,531,701 B2 | 12/2016 | Turgeman |
| 9,531,733 B2 | 12/2016 | Turgeman et al. |
| 9,536,071 B2 | 1/2017 | Turgeman |
| 9,541,995 B2 | 1/2017 | Turgeman et al. |
| 9,547,766 B2 | 1/2017 | Turgeman et al. |
| 9,552,470 B2 | 1/2017 | Turgeman et al. |
| 9,558,339 B2 | 1/2017 | Turgeman |
| 9,621,567 B2 | 4/2017 | Turgeman et al. |
| 9,626,677 B2 | 4/2017 | Turgeman et al. |
| 9,665,703 B2 | 5/2017 | Turgeman et al. |
| 9,674,218 B2 | 6/2017 | Turgeman |
| 9,690,915 B2 | 6/2017 | Turgeman et al. |
| 9,703,953 B2 | 7/2017 | Turgeman et al. |
| 9,712,558 B2 | 7/2017 | Turgeman |
| 2007/0152976 A1* | 7/2007 | Townsend ............... G06F 3/016 345/173 |
| 2008/0113791 A1 | 5/2008 | Williams et al. |
| 2010/0225443 A1 | 9/2010 | Bayram et al. |
| 2011/0098029 A1 | 4/2011 | Rhoads et al. |
| 2012/0054057 A1 | 3/2012 | O'Connell et al. |
| 2012/0235938 A1* | 9/2012 | Laubach ............. G06F 3/04883 345/173 |
| 2013/0126325 A1 | 5/2013 | Curtis et al. |
| 2013/0154948 A1 | 6/2013 | Schediwy et al. |
| 2013/0239195 A1 | 9/2013 | Turgeman |
| 2013/0279769 A1* | 10/2013 | Benkley, III ....... G06K 9/00013 382/124 |
| 2013/0288647 A1 | 10/2013 | Turgeman |
| 2014/0317028 A1 | 10/2014 | Turgeman et al. |
| 2014/0317726 A1 | 10/2014 | Turgeman et al. |
| 2014/0317744 A1 | 10/2014 | Turgeman et al. |
| 2014/0325223 A1 | 10/2014 | Turgeman et al. |
| 2014/0325645 A1 | 10/2014 | Turgeman et al. |
| 2014/0325646 A1 | 10/2014 | Turgeman et al. |
| 2014/0325682 A1 | 10/2014 | Turgeman et al. |
| 2014/0344927 A1 | 11/2014 | Turgeman et al. |
| 2015/0094030 A1 | 4/2015 | Turgeman |
| 2015/0205944 A1 | 7/2015 | Turgeman |
| 2015/0205955 A1 | 7/2015 | Turgeman |
| 2015/0205957 A1 | 7/2015 | Turgeman et al. |
| 2015/0205958 A1 | 7/2015 | Turgeman et al. |
| 2015/0212843 A1 | 7/2015 | Turgeman et al. |
| 2015/0213244 A1* | 7/2015 | Lymberopoulos ........................... H04L 63/0861 726/18 |
| 2015/0213246 A1 | 7/2015 | Turgeman et al. |
| 2015/0213251 A1 | 7/2015 | Turgeman |
| 2015/0256528 A1 | 9/2015 | Turgeman |
| 2015/0264572 A1 | 9/2015 | Turgeman |
| 2015/0310196 A1 | 10/2015 | Turgeman |
| 2015/0310444 A1* | 10/2015 | Chen .................. G06Q 20/3226 705/44 |
| 2015/0363585 A1 | 12/2015 | Gooding et al. |
| 2015/0379249 A1 | 12/2015 | Liang et al. |
| 2016/0004380 A1* | 1/2016 | Kim .................... G06F 3/04186 345/174 |
| 2016/0078274 A1 | 3/2016 | Tuneld et al. |
| 2016/0132105 A1 | 5/2016 | Turgeman et al. |
| 2016/0197918 A1 | 7/2016 | Turgeman et al. |
| 2016/0294837 A1 | 10/2016 | Turgeman |
| 2016/0300054 A1 | 10/2016 | Turgeman et al. |
| 2016/0306974 A1 | 10/2016 | Turgeman et al. |
| 2016/0307191 A1 | 10/2016 | Turgeman et al. |
| 2016/0307201 A1 | 10/2016 | Turgeman et al. |
| 2016/0321445 A1 | 11/2016 | Turgeman et al. |
| 2016/0321689 A1 | 11/2016 | Turgeman |
| 2016/0366177 A1 | 12/2016 | Turgeman |
| 2016/0371476 A1 | 12/2016 | Turgeman et al. |
| 2017/0011217 A1 | 1/2017 | Turgeman et al. |
| 2017/0012988 A1 | 1/2017 | Turgeman et al. |
| 2017/0017781 A1 | 1/2017 | Turgeman |
| 2017/0032114 A1 | 2/2017 | Turgeman |
| 2017/0054702 A1 | 2/2017 | Turgeman |
| 2017/0076089 A1 | 3/2017 | Turgeman |
| 2017/0085587 A1 | 3/2017 | Turgeman |
| 2017/0091450 A1 | 3/2017 | Turgeman |
| 2017/0126735 A1 | 5/2017 | Turgeman |
| 2017/0140279 A1 | 5/2017 | Turgeman |
| 2017/0154366 A1 | 6/2017 | Turgeman |
| 2017/0193526 A1 | 7/2017 | Turgeman et al. |
| 2017/0195356 A1 | 7/2017 | Turgeman et al. |
| 2017/0221064 A1 | 8/2017 | Turgeman et al. |
| 2018/0020350 A1* | 1/2018 | Vissa ................. G06K 9/00006 |

FOREIGN PATENT DOCUMENTS

| | | |
|---|---|---|
| WO | WO 15004598 A1 | 1/2015 |
| WO | WO 17006268 A1 | 1/2017 |

OTHER PUBLICATIONS

Written Opinion of the International Searching Authority in International Patent Application No. PCT/US2018/059388, dated Feb. 14, 2019.

International Preliminary Report on Patentability dated Jul. 2, 2020 in International Patent Application No. PCT/US2018/059388.

* cited by examiner

SYSTEMS AND METHODS FOR BEHAVIORAL AUTHENTICATION USING A TOUCH SENSOR DEVICE

TECHNICAL FIELD

The present disclosure relates to systems and methods for user authentication and, more particularly, to systems and methods for behavioral authentication using a touch sensor device.

BACKGROUND

Input devices including touch sensor devices (also commonly called touchscreens, touchpads, or proximity sensor devices), as well as fingerprint sensor devices, are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

One aspect of the disclosure provides an input device, comprising a touch sensor and a processing system. The touch sensor includes a touch sensing region and a plurality of pixels in the touch sensing region. The processing system is coupled to the touch sensor and comprises circuitry configured to: determine that a touch has occurred on a touch sensor; for each pixel included in the touch, receive touch information from the touch sensor; for each pixel included in the touch, determine a pixel response value for the pixel; and, compute a touch-based metric based on one or more pixel response values, wherein a model is used to perform behavioral authentication based on the touch-based metric.

Another aspect of the disclosure provides a touch controller for a touch sensor, the touch sensor having a touch sensing region including a plurality of pixels. The touch controller comprises circuitry configured to: determine that a touch has occurred on the touch sensor; for each pixel included in the touch, receive touch information from the touch sensor; for each pixel included in the touch, determine a pixel response value for the pixel; and compute a touch-based metric based on one or more pixel response values, wherein a model is used to perform behavioral authentication based on the touch-based metric.

Further aspects of the disclosure provide a method and a non-transitory computer-readable medium storing instructions that, when executed by a processor, cause a computer system to perform behavioral authentication, by performing the steps of: receiving, by one or more processors, touch information associated with a touch on a touch sensor included in an input device; computing, by the one or more processors, one or more touch-based metrics associated with the touch; and causing, by the one or more processors, a model to be executed to perform behavioral authentication based on the one or more touch-based metrics.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary, and brief description of the drawings, or the following detailed description.

User authentication refers to verification of a human-to-machine transfer of credentials required for confirmation of a user's authenticity. "Active authentication" refers to a user being prompted for an input, which is then used to authenticate the user. Fingerprint authentication is an example of active authentication.

User authentication can also include "passive authentication," also referred to as "behavioral authentication" or "continuous authentication" or "persistent authentication." In the present disclosure, behavioral authentication refers to the concept of authenticating a user by measuring and learning aspects of the user's behavior that can be associated to a specific user. Examples of behavioral authentication measurements include measuring a user's gait (e.g., using an accelerometer), measuring a user's location at a specific time, and so forth. Behavioral authentication can be used, for example, to re-authenticate a user automatically at certain time intervals based on one or more measurements taken based on the user's behavior.

Embodiments provide systems and methods that measure how a user interacts with a touch sensor device (for example, a touchscreen or touchpad of a mobile device) for the purpose of behavioral authentication. In some embodiments, touch sensor device measurements that are used for normal operation of the touch sensor device are augmented to generate measurements for behavioral authentication.

Figure 1:
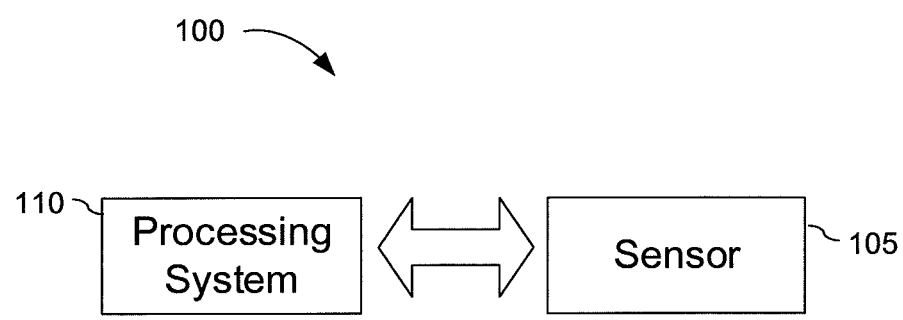
FIG. 1 is a block diagram of an example input device.

FIG. 1 is a block diagram of an example input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as communication devices, desktop computers, laptop computers, netbook computers, tablets, web browsers, e-book readers, personal digital assistants (PDAs), and wearable computers (such as smart watches and activity tracker devices). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 105 is included with the input device 100. The sensor 105 comprises one or more sensing elements configured to sense input provided by one or more input objects in a sensing region. Examples of input objects include fingers, styli, and hands. Sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region. Some implementations utilize arrays or other regular or irregular patterns of multiple sensing elements to detect the input. Example sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the input device 100 may use capacitive techniques where voltage or current is applied to create an electric field. Nearby input objects cause changes in the electric field, and produce detectable changes in capacitive coupling that may be detected as changes in voltage, current, or the like. A plurality of sensor electrodes may be arranged in various manners, for example, in a grid of electrodes utilized as capacitive sensing elements, a pattern of plates in one, two, or more layers, or by interleaving the plurality of electrodes, among others. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

In another example, the input device 100 may use resistive sensing techniques where contact from an input object closes an electrical circuit and can be used to detect input. In one example technique, the sensor 105 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the input device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the input device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In FIG. 1, a processing system 110 is included with the input device 100. The processing system 110 comprises parts of or all of one or more integrated circuits (ICs) and/or other circuitry components. The processing system 110 is coupled to the sensor 105 and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for a mutual capacitance sensor device may comprise transmitter circuitry configured to transmit signals with one or more transmitter sensor electrodes of the sensor 105, and/or receiver circuitry configured to receive resulting signals with one or more receiver sensor electrodes of the sensor 105. As another example, a processing system for a self capacitance sensor device may comprise driver circuitry configured to drive absolute capacitance signals onto one or more sensor electrodes of the sensor 105, and/or receiver circuitry configured to receive resulting signals with the same or different sensor electrodes of the sensor 105. As a further example, a processing system for an ultrasonic sensor device may comprise driver circuitry configured to drive acoustic signals with ultrasonic transmitter elements, and/or receiver circuitry configured to receive signals with ultrasonic receiving elements. As a yet further example, a processing system for an optical sensor device may comprise driver circuitry configured to drive illumination signals to one or more LEDs or other light sources, and/or receiver circuitry configured to receive signals with optical receiving elements.

The processing system 110 may include electronically-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
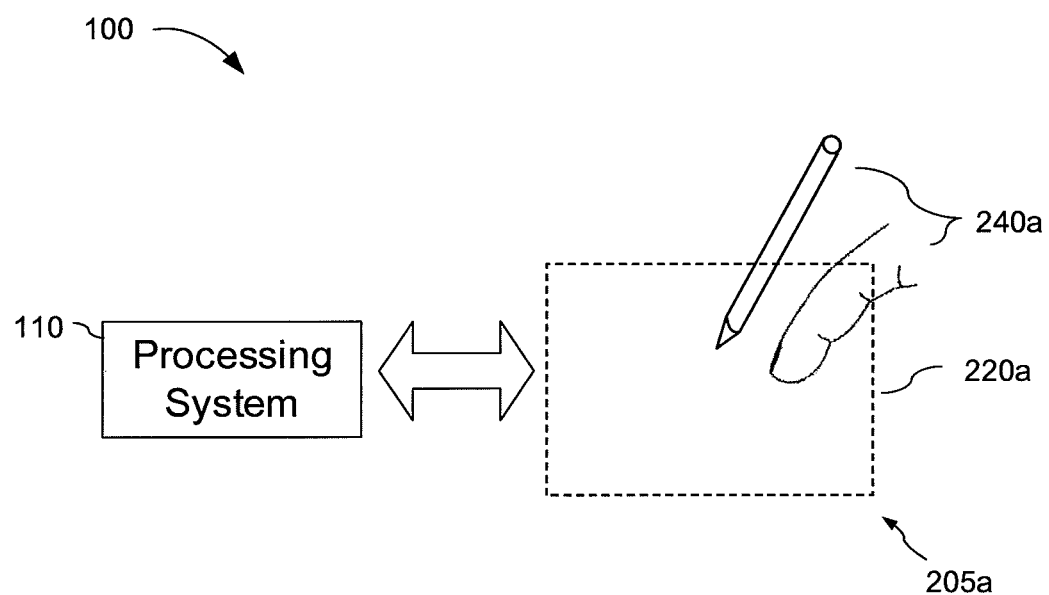
FIG. 2A is a block diagram of another example input device.
Figure 2B:
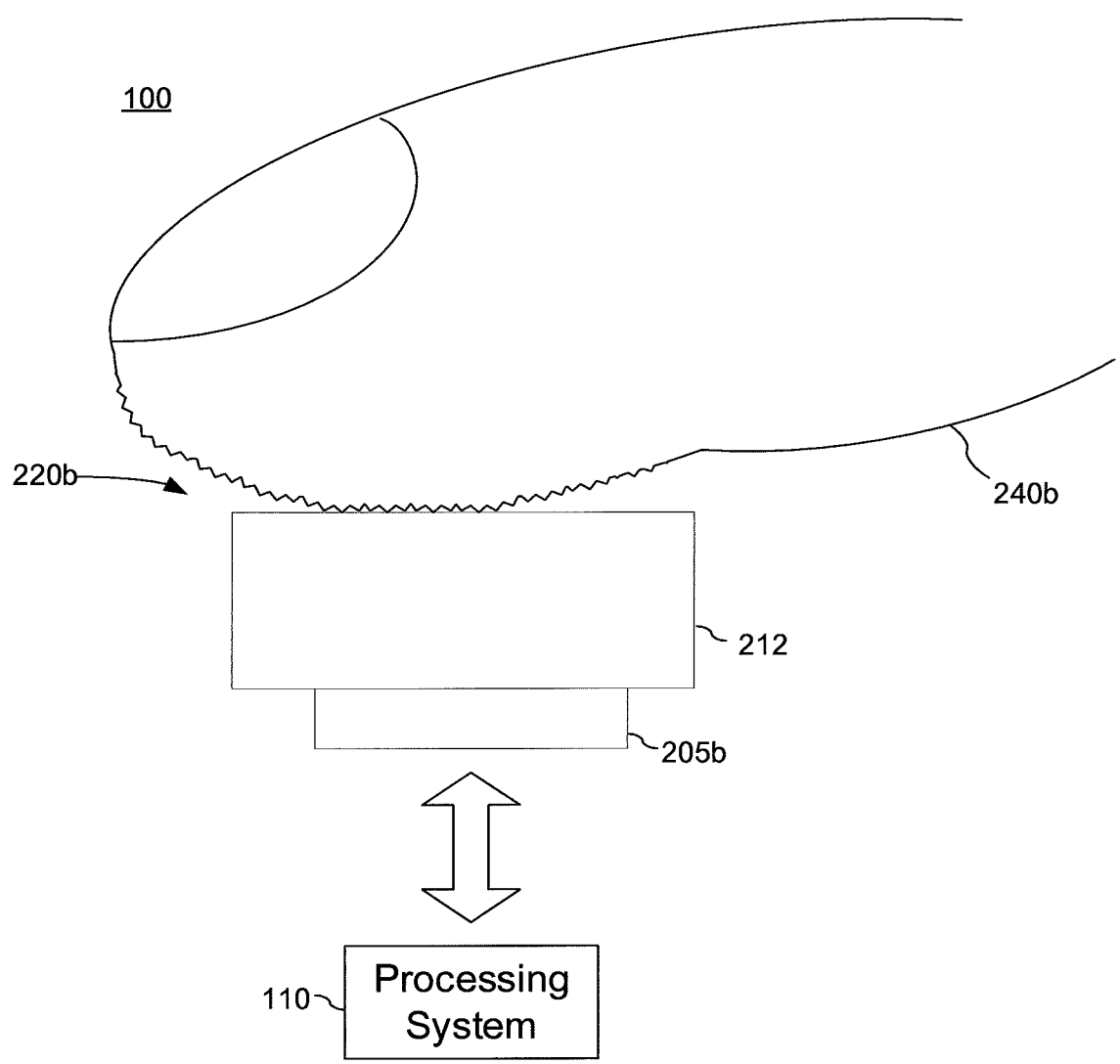
FIG. 2B is a block diagram of another example input device.

FIGS. 2A-2B depict further example input devices 100. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The sensor 205b is disposed underneath a cover layer 212 that provides an input surface for the fingerprint to be placed on or swiped over the sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3A:
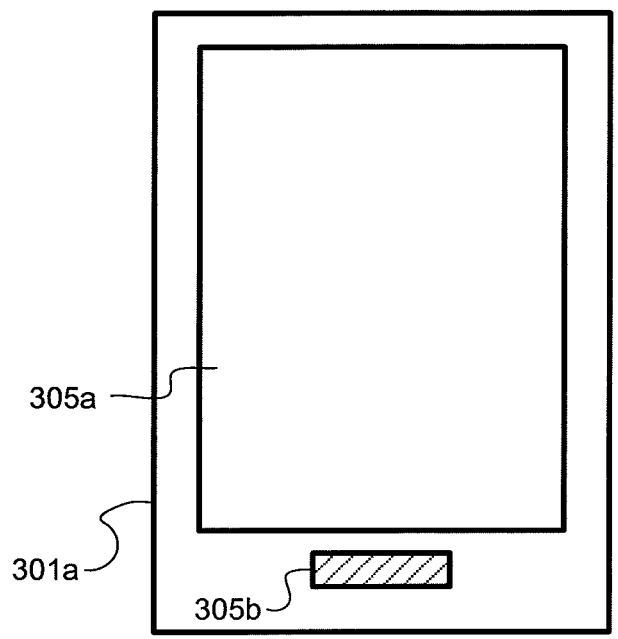
FIGS. 3A-3B are block diagrams illustrating example electronic devices having both a touchscreen interface and a fingerprint sensing interface.
Figure 3B:
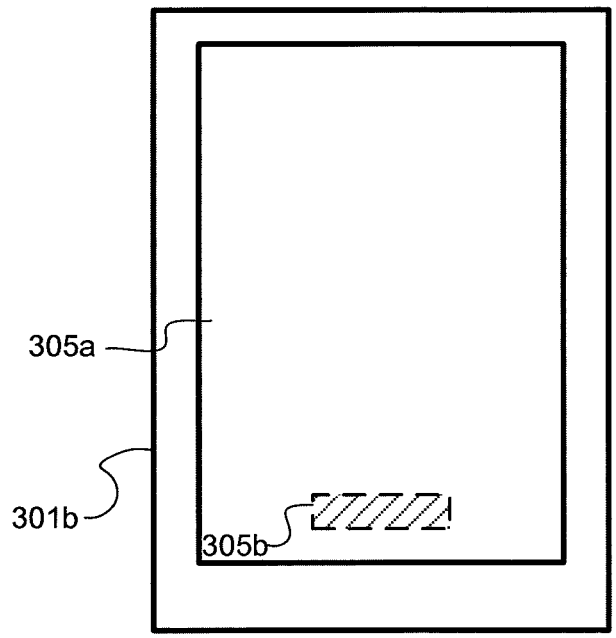

FIGS. 3A-3B are block diagrams illustrating example electronic devices 301a and 301b having both a touchscreen interface and a fingerprint sensing interface. In FIG. 3A, the electronic device (e.g., a mobile device, such as a smartphone or tablet) 301a has a fingerprint sensor 305b that is separate from a touch sensor 305a, such that the fingerprint sensor and the touch sensor (of the touchscreen) have separate interfaces. In FIG. 3B, the electronic device 301b has a fingerprint sensor 305b that is integrated with the touch sensor 305a, such that the interface for the fingerprint sensor overlaps with the interface for the touch sensor.

Figure 4:
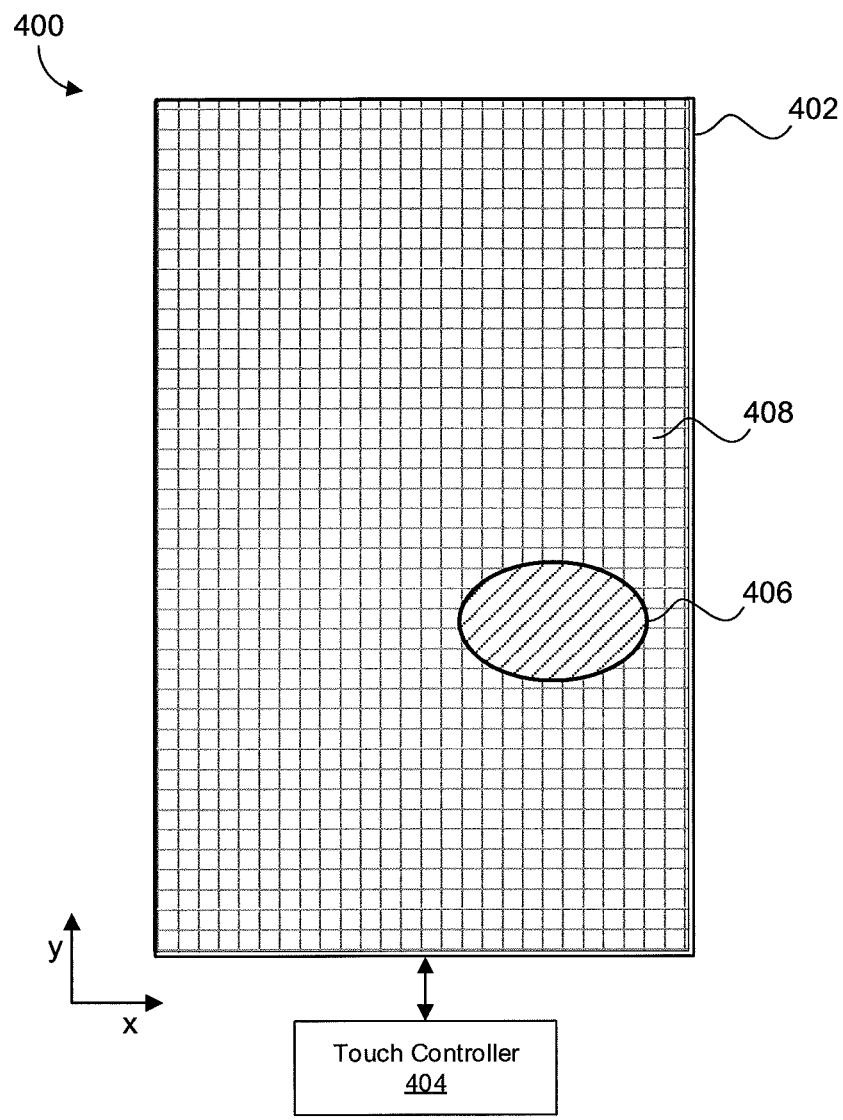
FIG. 4 depicts an example touch sensing system.

FIG. 4 depicts an example touch sensing system 400. Touch sensing system 400 includes a sensor 402 and a touch controller 404. In the example shown in FIG. 4, the sensor 402 comprises a touchscreen panel. There are a variety of touchscreen technologies with different methods of sensing touch, such as capacitive, resistive, surface acoustic wave, infrared grid, infrared acrylic projection, optical imaging, dispersive signal technology, and acoustic pulse recognition, for example. In one embodiment, the touch controller 404 comprises a processor that executes instructions stored in a memory. In other embodiments, the touch controller 404 comprises fixed function hardware (e.g., FPGA). In still further embodiments, the touch controller 404 comprises a combination of hardware and software elements.

Using capacitive touchscreen technology as an example, a capacitive touchscreen panel includes an insulator, such as glass, coated with a transparent conductor, such as indium tin oxide (ITO). As the human body is also an electrical conductor, touching the surface of the touchscreen results in a distortion of the touchscreen's electrostatic field, measurable as a change in capacitance. Different technologies may be used to determine the location of the touch.

As shown in FIG. 4, the touchscreen panel of the sensor 402 comprises a plurality of pixels 408 arranged in a grid having an x-axis and a y-axis. In order to detect touch position information of a touch of a finger 406 in a sensing region of the sensor 402, the sensor 402 may be configured to detect which portions (i.e., which pixels 408) of the sensor 402 are fully or partially covered by the finger 406.

In some implementations, the touch controller 404 receives touch information from the pixels of the sensor 402 to determine which pixels 408 are fully covered or partially covered by the finger 406. A pixel can be determined as being fully or partially covered based on the capacitance change of the pixel, for example, relative to a baseline value (i.e., no touch). In one implementation, a fully covered pixel reaches a saturated change in value; whereas, the change in value for a partially covered pixel is a fraction of the saturated change. Touch coordinates of the finger 406 may be calculated by the touch controller 404 by combining finger coverage information from the pixels 408 of the sensor 402.

According to some embodiments, behavioral authentication involves supplying various metrics into a computer model (such as a neural network) that combines the metrics to output one or more values representative of how a user interacts with the device. Various metrics can be input into the model, such as the time of day, a location of the device, which applications are open, etc. The model applies weights to the metrics, and an output of the model is used for behavioral authentication by comparing the output to one or more values representative of the authentic user to determine whether there is a match. Behavioral authentication can be performed in the background and, in some embodiments, does not include the user receiving an active prompt for authentication. Also, the model may be continuously updated, or "trained," based on receiving the various metrics over time. Over time, the model is updated or refined, as the weights assigned to individual metrics are continually adjusted.

When the output of the model suggests, based on the metrics, that the user of the device is not the authentic user, the device may request the user to actively authenticate (e.g., with a fingerprint or password or other user authentication method) or may block a transaction or close an application.

As described, various metrics can be used to execute the model for behavioral authentication. Some non-limiting examples include: a user's gait measured by an accelerometer, a user's location at a given time, information about which applications are open at a given time, etc.

According to some embodiments, one or more metrics input into the model are based on how the user touches and uses the touchscreen, referred to herein as "touch-based metrics." Examples of touch-based metrics include a touch position, a major axis of the touch, a minor axis of the touch, and a touch perimeter, as described in greater detail below.

In one embodiment, these and other touch-based metrics described herein can be computed by the touch controller and passed to a host processor that executes the model. In another embodiment, the touch controller executes the model. In still further embodiments, the touch controller receives touch information from the pixels of the sensor 402 and passes the touch information on to the host processor to compute the touch-based metrics that are input into the model. In still further embodiments, the touch controller can compute some of the metrics and the host process can compute some of the metrics.

In one embodiment, one or more touch-based metrics are computed based on one frame of touch corresponding to a user interacting with a touch sensor device. In another embodiment, one or more touch-based metrics are computed based on two or more frames of touch corresponding to a sequence of frames of a user interacting with a touch sensor device. For example, data from two or more frames may be analyzed by taking a differential or by aggregating the data (e.g., averaging) to generate one or more touch-based metrics.

Figure 5A:
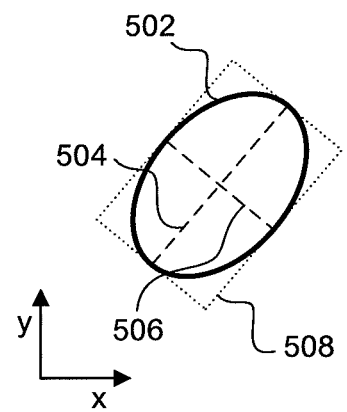
FIGS. 5A-5B depict examples of touch-based metrics.
Figure 5B:
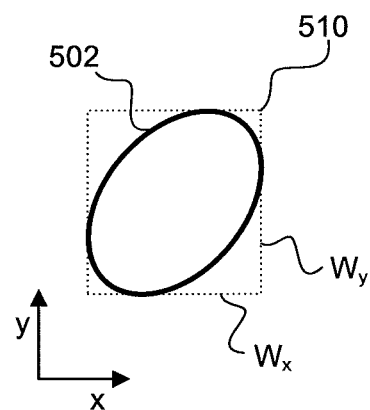

FIGS. 5A-5B depict examples of touch-based metrics. In FIG. 5A, a touch 502 covers a certain area of pixels in an ellipse-like shape. A major axis 504 of the touch 502 represents the longer axis of the ellipse passing through its foci. A minor axis 506 of the touch 502 represents the shorter axis of the ellipse that is perpendicular to its major axis 504. In FIG. 5A, a bounding box 508 can be computed, where two sides of the bounding box 508 are parallel to the major axis 504 and two sides of the bounding box 508 are parallel to the minor axis 506. The total length of the segments of the bounding box 508 can be referred to as the "touch perimeter," or "W." One or more of a major axis length, a major axis location on the touchscreen, a minor axis length, a minor axis location on the touchscreen, a bounding box location on the touchscreen, a bounding box width, a bounding box length, and a touch perimeter (W) can be used as touch-based metrics that can be input to a model for performing behavioral authentication. Another example metric is "dW/dt," which refers to a rate of change in the W value over time.

FIG. 5B depicts another embodiment for calculating the touch perimeter. The bounding box 510 in FIG. 5B is computed such that two sides of the bounding box 510 are parallel to the x-axis of the touchscreen and two sides of the bounding box 510 are parallel to the y-axis of the touchscreen. As described above, the total length of the segments of the bounding box 510 can be referred to as the touch perimeter (W), where the touch perimeter can be used as a touch-based metric that can be input to a model for performing behavioral authentication. In some embodiments, a bounding box width $W_x$ and a bounding box length $W_y$ may be used as metrics that are input to the model, where $W_x$ and $W_y$ represent the lengths of the bounding box sides.

According to some embodiments, the touch controller 404 can generate additional touch-based metrics that are used for behavioral authentication. Some examples include "touch volume" and "touch rate," as described in greater detail below.

Figure 6:
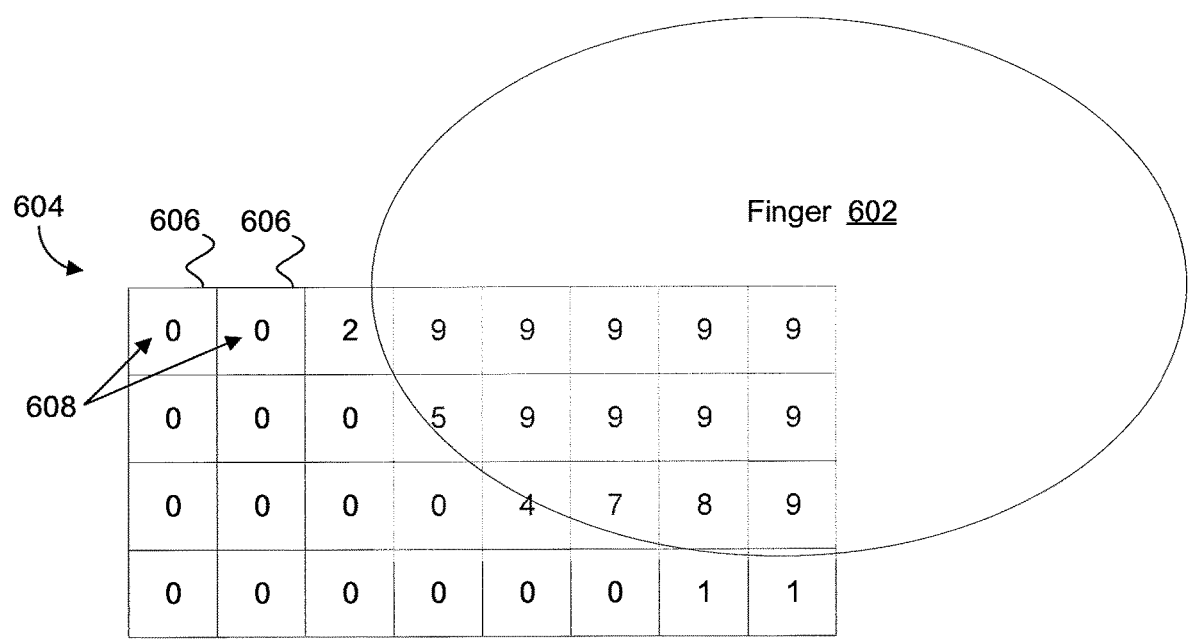
FIG. 6 depicts an example of a finger touching a touchscreen.

FIG. 6 depicts an example of a finger 602 touching a touchscreen 604. The touchscreen 604 comprises a plurality of pixels 606. As shown, the finger 602 fully covers some of the pixels, partially covers some of the pixels, and does not cover some of the pixels at all. For each pixel in the touchscreen 604, a touch controller determines a pixel response value for the pixel. In one implementation, the pixel response value is based on a difference of a measured pixel value (e.g., a capacitance value) relative to a baseline value (e.g., a baseline capacitance value). In another implementation, the pixel response value is determined based on a taking a differential of the pixel response between the given pixel and one or more neighboring pixels. In yet another implementation, the pixel response value is determined on an absolute scale and is not based on a differential.

As shown in the example in FIG. 6, the pixel response value may be on a scale of 0 to 9, where 0 refers to no coverage (e.g., pixel response value 608) and 9 refers to full coverage of the pixel by the finger, i.e., the saturated value. For pixels that are partially covered by the finger, the pixel response value is somewhere between 0 and 9, depending on how much of the pixel is covered. The range of pixel response values from 0 to 9 is merely an example, and another other technique for disambiguating different pixel response values may be used. In another implementation, it is also possible to make various kinds of differential measurements that do not require a baseline. For instance, the pixel response value can be determined by examining the change relative to neighboring electrodes, or the change relative to a previous frame. In these implementations, the signal against which the differential measurement is determined can be considered a "baseline".

According to some embodiments, characteristics of a user's touch that make the user's touch unique to the user include an area of touch, a speed at which the user touches the touchscreen, and a rate at which the user's finger deforms to the surface of the touchscreen, for example. Therefore, the touch information from the sensor can be used by the touch controller to generate values for "Z" and "dZ/dT," which are metrics that can be used to perform behavioral authentication. As used herein, "Z" refers to a sum of the pixel response values in the touch region (see, FIG. 4, pixels fully covered or partially covered by the finger 406) of a given finger touch.

For example, Z can be defined for a $k^{th}$ frame using the equation:

$$Z^k = \Sigma_{(i,j) \in touched\ pixels} \Delta C^k(i,j)$$

In the equation, (i,j) refers to the coordinates of a pixel in a set of touched pixels. Touched pixels includes pixels that are at least partially touched or covered.

Figure 7:
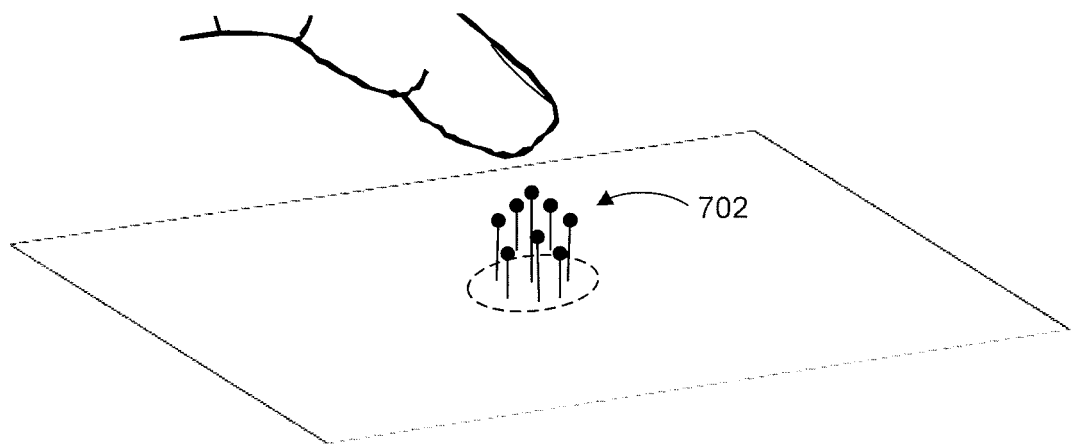
FIG. 7 is an example schematic diagram of pixels under a touch.

The Z value for a given touch can be referred to as a "touch volume," which refers to a combined intensity (relative to a baseline) of the touch from each touched pixel. FIG. 7 is an example schematic diagram of pixels under a touch. Pixel response values for pixels included in the touch are represented by lines 702, where a longer line indicates a stronger pixel response and thus a higher pixel response value.

In some embodiments, the metric input to the behavioral authentication model is the Z value itself. In other implementations, additional metrics can be computed from the Z value. For example, one metric could be $\sqrt{Z}$, which is the square-root of Z. Another example metric is "dZ/dt," which refers to a rate of change in the Z value over time (or "touch rate").

In one example implementation, a touchscreen frame rate is 100 Hz. Thus, dZ/dT can be approximated for a $k^{th}$ frame using the equation:

$$\frac{dZ}{dt} \approx \frac{Z^k - Z^{k-1}}{t_k - t_{k-1}} \approx 100(Z^k - Z^{k-1})$$

In some implementations, it takes about 30 ms to 60 ms for a user's finger to settle on a touchscreen after initial contact with the touchscreen. With a touchscreen frame rate of 100 Hz, three to six values of dZ/dt can be produced from the time of initial contact to the time of settling of the finger. A frame rate of 100 Hz is merely an example, and any frame rate could be used in other implementations. Furthermore, it is noted that the dZ/dt metric can be a useful metric used for behavioral authentication even as the finger moves on the touchscreen.

Although some embodiments have been described with respect to a touchscreen, other embodiments can be equally applied to a touchpad or any touch-sensitive surface. In addition, although some embodiments have been described with respect to capacitive sensing, other embodiments can include computing touch-based metrics for behavioral authentication using other sensing technologies. For example, for optical sensing, the Z value for a given touch can be computed based on determining a grayscale value of each pixel of the touch, comparing the grayscale values to a baseline value to generate grayscale pixel response values, and computing a sum of the grayscale pixel response values.

Figure 8:
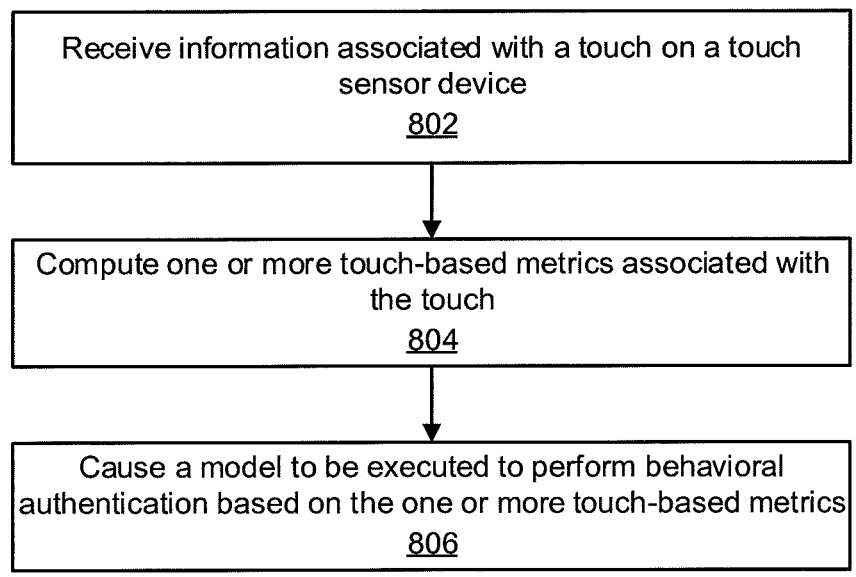
FIG. 8 is an example method for operating a touch controller to determine one or more touch-based metrics used for behavioral authentication, according to some embodiments.

FIG. 8 is an example method for causing a model to be executed for performing behavioral authentication. At step 802, a processing system receives information associated with a touch on a touch sensor device. In one embodiment, the processing system is a touch controller associated with or integrated with the touch sensor device. In some embodiments, the touch sensor device comprises a touchscreen or a touchpad.

At step 804, the processing system computes one or more touch-based metrics associated with the touch. As described herein, the one or more metrics can include: a touch location at a given time, a major axis length of the touch, a major axis location on the touch sensor device, a minor axis length, a minor axis location on the touch sensor device, a bounding box location on the touch sensor device, a bounding box width, a bounding box length, a touch perimeter, a rate of change in the touch perimeter value over time, a touch volume value (i.e., a sum of pixel response values of the pixels of the touch), and a rate of change in the touch volume value over time, for example. Alternatively, the one or more touch metrics can be determined over time from a sequence of touch values. For example, touch position, touch volume value, and rate of change in the touch volume can be aggregated (e.g., by averaging) over time over a sequence of touch values. In another example, a touch-based metric may be based on analyzing pixel response values from a time series of frames during which the finger is touching the touch sensor device.

At step 806, the processing system causes a model to be executed to perform behavioral authentication based on the one or more touch-based metrics. The model can be executed passively or continuously without explicit request for user input to authenticate. The model can apply a weighting to each of the metrics input into the model and generate an output. The output is analyzed to make an authentication decision. In one implementation, the output is compared to a threshold, and if the output exceeds the threshold, the user is deemed to be the authentic user.

In some implementations, the processing system (i.e., touch controller) transmits the one or more metrics to another processing system (for example, device host processor) that executes the model. In other implementations, the processing system (i.e., touch controller) executes the model. As also described above, the model may be continuously updated, or "trained," based on receiving the various metrics over time. Over time, the model is updated or refined, as the weights assigned to individual metrics are continually adjusted.

Although FIG. 8 describes one instance of causing a model to be executed for performing behavioral authentication, the method in FIG. 8 can be repeated continuously as long as the user is touching the touch sensor device. As such, in one implementation, different moments in time, or frames, during which the finger is touching the touch sensor device may comprise a time series of frames. One or more touch-based metrics can be computed based on the time series of frames.

Figure 9:
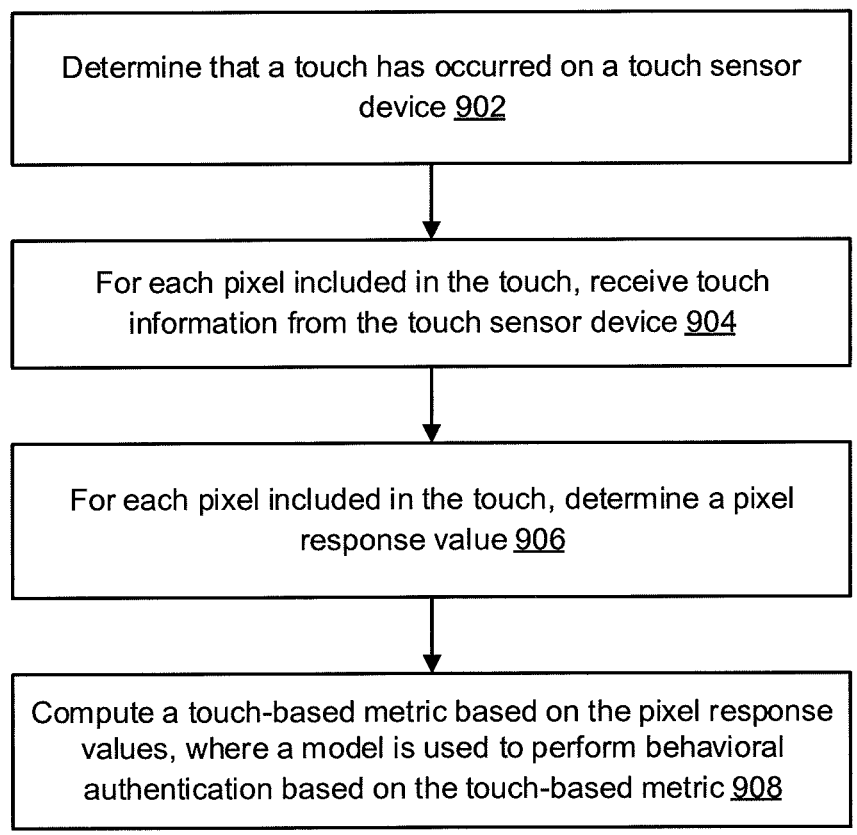
FIG. 9 is an example method for operating a touch controller to determine one or more touch-based metrics used for behavioral authentication, according to some embodiments.

FIG. 9 is an example method for operating a touch controller to determine one or more touch-based metrics used for behavioral authentication, according to some embodiments. At step 902, a processing system determines that a touch has occurred on a touch sensor device. In one embodiment, the processing system is a touch controller associated with or integrated with the touch sensor device. In some embodiments, the touch sensor device comprises a touchscreen or a touchpad.

At step 904, for each pixel included in the touch, the processing system receives touch information from the touch sensor device. For example, the touch information may comprise a capacitance value for each pixel.

At step 906, for each pixel included in the touch, the processing system determines a pixel response value. In one example, the pixel response value can be a difference of a measured pixel value (e.g., a capacitance value) relative to a baseline value associated with no touch.

At step 908, the processing system computes a touch-based metric based on the pixel response values, where a model is used to perform behavioral authentication based on the touch-based metric. One example metric is a sum of pixel response values. Another example metric is a rate of change in the sum of pixel response values over time. Other metrics can also be computed, as described herein. For example, the touch-based metric may be based on multiple frames of touch input.

As also described herein, the model can be executed by the processing system (i.e., the touch controller) or another processor (e.g., a host processor).

Although FIG. 9 describes one instance of operating a touch controller to determine one or more touch-based metrics used for behavioral authentication, the method in FIG. 9 can be repeated continuously as long as the user is touching the touch sensor device. In addition, as also described above, the metrics input into the model may be used to further refine or train the model.

Accordingly, some embodiments provide a system and method for computing one or more touch-based metrics that can be input into a behavioral authentication model. By including touch-based metrics in the model, the additional model parameters help to increase the model's ability to accurately identify authentic and imposter users using behavioral authentication.

In one example use case, an icon may be displayed on a touch-sensitive display device. When a user presses on the icon, a touch-sensitive display registers a touch within the icon and certain actions are performed corresponding to the icon (e.g., open an app on a mobile device). In addition, one or more touch-based metrics may be computed associated with the touch, as described herein. These touch-based metrics can then be input into a model (along with other metrics not related to the touch) to perform behavioral authentication. An output of the model can be compared to a threshold to make a determination as to the authenticity of the user. If the outputs indicates that the user is not the authentic user (e.g., the output is below the threshold), then the device may request the user to actively authenticate (e.g., with a fingerprint or password or other user authentication method) or may block a transaction or close an application. This use case is merely an example, and other use cases are also within the scope of the disclosure.

While the forgoing description includes examples particularly advantageous for touchscreen sensors, the above techniques may also be used with opaque touchpad sensors. Also, the above techniques may be used to integrate other types of sensors having different resolutions, beyond just sensors configured to detect touch locations.

It should be understood that while certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 110). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Several embodiments of the claimed invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
   a touch sensor comprising a touch sensing region and a plurality of pixels in the touch sensing region; and
   a processing system coupled to the touch sensor, wherein the processing system comprises circuitry configured to:
   determine that a touch has occurred on the touch sensor;
   for each pixel included in the touch, receive touch information from the touch sensor;
   for each pixel included in the touch, determine a pixel response value for the pixel;
   determine one or more applications that are open on the input device at a time that the touch occurred;
   compute a touch-based metric based on one or more pixel response values, wherein the touch-based metric is based on a rate of change of a sum of the pixel response values for the pixels included in the touch over two or more frames and a frame rate of the touch sensor; and
   cause a model to be executed to perform behavioral authentication passively without explicit request for user input, wherein the model takes as input: (a) information about the one or more applications that are open on the input device at the time that the touch occurred without explicit request from the one or more applications for user authentication, and (b) the touch-based metric.

2. The input device of claim 1, wherein the touch sensor comprises a capacitive touch sensor including a plurality of electrodes that form the plurality of pixels.

3. The input device of claim 1,
   wherein touch information for a first pixel included in the touch comprises a capacitance value of the first pixel,
   wherein a baseline value corresponds to a capacitance value of a pixel where no touch occurs, and
   wherein determining the pixel response value for the first pixel comprises:
   subtracting the capacitance value of the first pixel from the capacitance value corresponding to the baseline value.

4. The input device of claim 1, wherein the touch-based metric comprises one or more of: a location of the touch on the touch sensor, a major axis length of the touch, a major axis location of the touch on the touch sensor, a minor axis length of the touch, a minor axis location of the touch on the touch sensor, a location of a bounding box of the touch on the touch sensor, a touch perimeter of the touch, and a rate of change of the touch perimeter of the touch.

5. The input device of claim 4, wherein the touch has an ellipse-like shape, wherein a major axis of the touch represents a longer axis passing through foci of the ellipse-like shape, wherein a minor axis of the touch represents a shorter axis of the ellipse-like shape, wherein the minor axis is perpendicular to the major axis, and wherein two sides of the bounding box are parallel to the major axis and two sides of the bounding box are parallel to the minor axis.

6. The input device of claim 4, wherein two sides of the bounding box are parallel to an x-axis of the touch sensing region and two sides of the bounding box are parallel to a y-axis of the touch sensing region.

7. The input device of claim 1, further comprising:
updating the model based on the touch-based metric, wherein updating the model comprises updating at least one weight value associated with at least one metric used by the model to perform behavioral authentication.

8. The input device of claim 1, wherein the model that is used to perform behavioral authentication takes as input additional metrics to make an authentication decision.

9. The input device of claim 1, wherein the touch-based metric is further based on a square root of the sum of the pixel response values included in the touch in a given frame of the two or more frames.

10. A touch controller for a touch sensor, the touch sensor having a touch sensing region including a plurality of pixels, wherein the touch controller comprises circuitry configured to:
determine that a touch has occurred on the touch sensor;
for each pixel included in the touch, receive touch information from the touch sensor;
for each pixel included in the touch, determine a pixel response value for the pixel;
compute a touch-based metric based on one or more pixel response values, wherein the touch-based metric is based on a rate of change of a sum of the pixel response values for the pixels included in the touch over two or more frames and a frame rate of the touch sensor; and
cause a model to be executed to perform behavioral authentication passively without explicit request for user input wherein the model takes as input: (a) information about the one or more applications that are open on the input device at the time that the touch occurred without explicit request from the one or more applications for user authentication, and (b) the touch-based metric.

11. The touch controller of claim 10, wherein the touch-based metric comprises one or more of: a location of the touch on the touch sensor, a major axis length of the touch, a major axis location of the touch on the touch sensor, a minor axis length of the touch, a minor axis location of the touch on the touch sensor, a location of a bounding box of the touch on the touch sensor, a touch perimeter of the touch, and a rate of change of the touch perimeter of the touch.

12. The touch controller of claim 10, wherein the touch sensor comprises a capacitive touch sensor including a plurality of electrodes that form the plurality of pixels.

13. The touch controller of claim 10,
wherein touch information for a first pixel included in the touch comprises a capacitance value of the first pixel, wherein a baseline value corresponds to a capacitance value of a pixel where no touch occurs, and
wherein determining the pixel response value for the first pixel comprises:
subtracting the capacitance value of the first pixel from the capacitance value corresponding to the baseline value.

14. The touch controller of claim 10, wherein the touch-based metric is further based on a square root of the sum of the pixel response values included in the touch in a given frame of the two or more frames.

15. A method for performing behavioral authentication, comprising:
receiving, by one or more processors, touch information associated with a touch on a touch sensor included in an input device;
computing, by the one or more processors, one or more touch-based metrics associated with the touch, wherein the one or more touch-based metrics are based on a rate of change of a sum of pixel response values for pixels included in the touch over two or more frames and a frame rate of the touch sensor;
determining, by the one or more processors, one or more applications that are open on the input device at a time that the touch occurred on the touch sensor; and
causing, by the one or more processors, a model to be executed to perform behavioral authentication passively without explicit request for user input, wherein the model takes as input: (a) information about the one or more applications that are open on the input device at the time that the touch occurred without explicit request from the one or more applications for user authentication, and (b) the one or more touch-based metrics.

16. The method of claim 15, wherein the model receives one or more metrics as input, wherein the one or more metrics includes the one or more touch-based metrics, to determine whether a user of the input device is an authentic user.

17. The method of claim 15, wherein the touch information comprises capacitance values associated with pixels included in the touch.

18. The method of claim 15, wherein the one or more touch-based metrics include one or more of: a location of the touch on the touch sensor, a major axis length of the touch, a major axis location of the touch on the touch sensor, a minor axis length of the touch, a minor axis location of the touch on the touch sensor, a location of a bounding box of the touch on the touch sensor, a touch perimeter of the touch, and a rate of change of the touch perimeter of the touch.

19. The method of claim 15, further comprising:
updating the model based on the one or more touch-based metrics, wherein updating the model comprises updating at least one weight value associated with at least one metric used by the model to perform behavioral authentication.

20. The method of claim 15, wherein the one or more touch-based metrics are further based on a square root of the sum of the pixel response values included in the touch in a given frame of the two or more frames.

21. A non-transitory computer-readable medium storing instructions that, when executed by a processor, cause a computer system to perform behavioral authentication, by performing the steps of:
receiving touch information associated with a touch on a touch sensor included in an input device;
computing one or more touch-based metrics associated with the touch, wherein the one or more touch-based metrics are based on a rate of change of a sum of pixel response values for pixels included in the touch over two or more frames and a frame rate of the touch sensor;

determining one or more applications that are open on the input device at a time that the touch occurred on the touch sensor; and causing a model to be executed to perform behavioral authentication passively without explicit request for user input, wherein the model takes as input: (a) information about the one or more applications that are open on the input device at the time that the touch occurred without explicit request from the one or more applications for user authentication, and (b) the one or more touch-based metrics.

22. The computer-readable medium of claim 21, wherein the instructions further cause the computer system to perform the steps of:

updating the model based on the one or more touch-based metrics, wherein updating the model comprises updating at least one weight value associated with at least one metric used by the model to perform behavioral authentication.

23. The computer-readable medium of claim 21, wherein the one or more touch-based metrics are further based on a square root of the sum of the pixel response values included in the touch in a given frame of the two or more frames.

* * * * *